(No Model.) 4 Sheets—Sheet 1.
C. PAYEN.
PROCESS OF PRODUCING CRYSTALLIZED METAL PLATES.
No. 415,349. Patented Nov. 19, 1889.
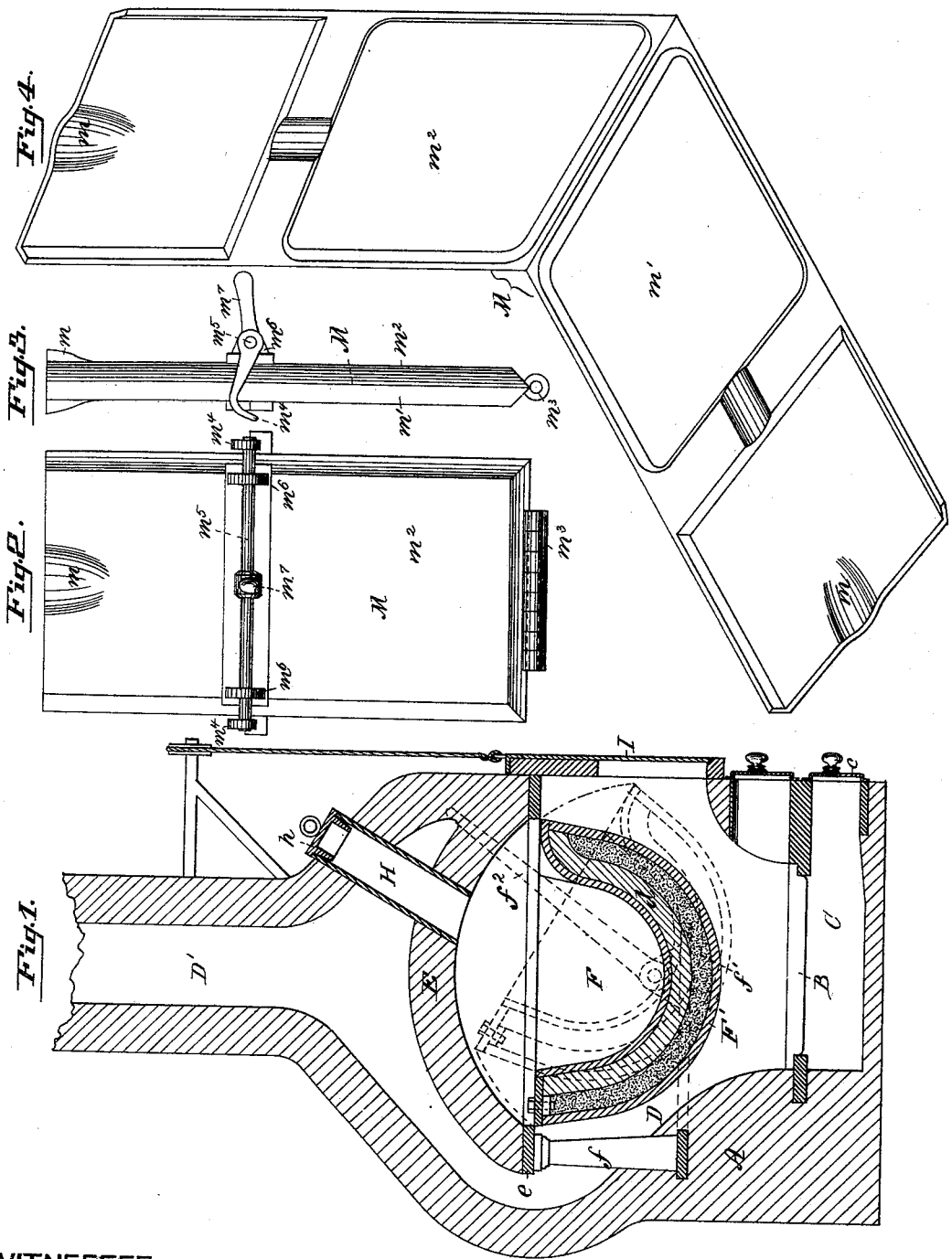
WITNESSES:
Hermann Bormann
Thomas M. Smith.
INVENTOR:
Clement Payen,
by J. Walter Douglass,
Atty.

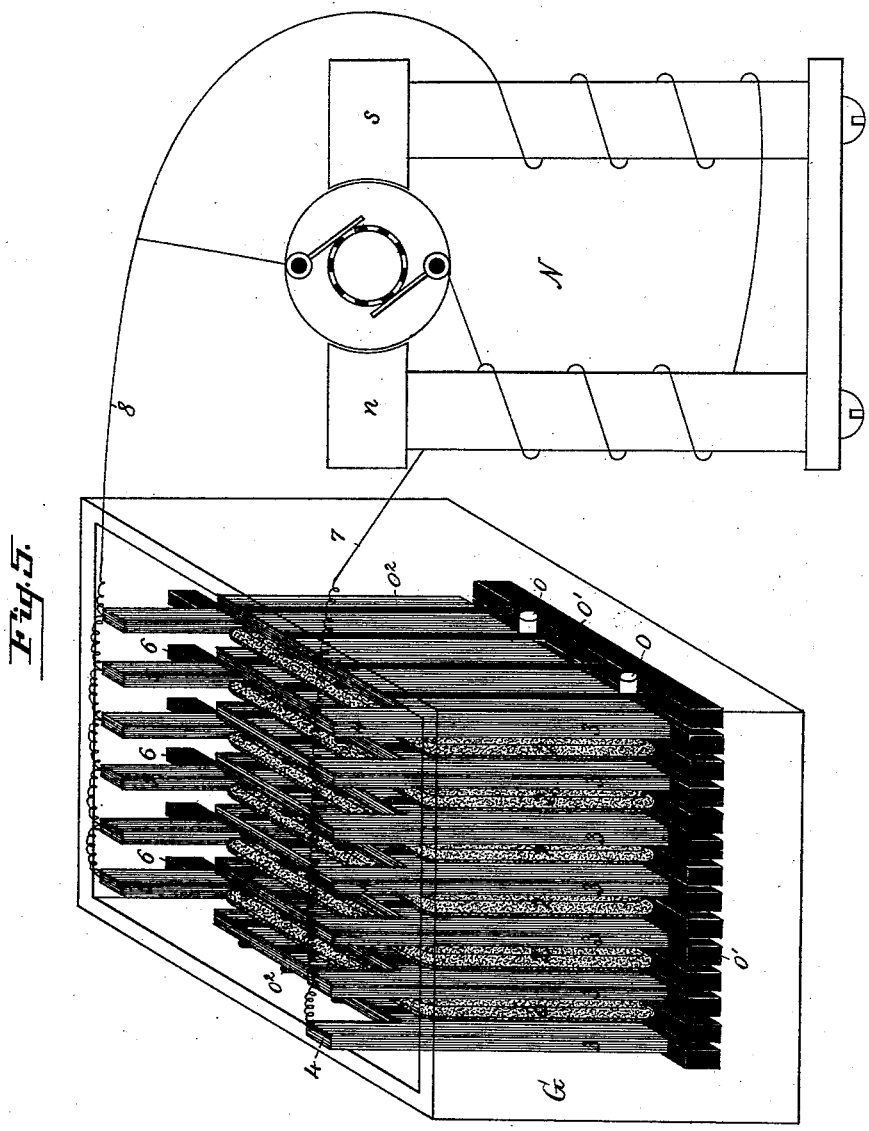

(No Model.) 4 Sheets—Sheet 3.

C. PAYEN.
PROCESS OF PRODUCING CRYSTALLIZED METAL PLATES.

No. 415,349. Patented Nov. 19, 1889.

WITNESSES
Hermann Bormann.
Thomas M. Smith.

INVENTOR:
Clement Payen,
by J. Walter Douglass,
Atty.

(No Model.) 4 Sheets—Sheet 4.
C. PAYEN.
PROCESS OF PRODUCING CRYSTALLIZED METAL PLATES.
No. 415,349. Patented Nov. 19, 1889.
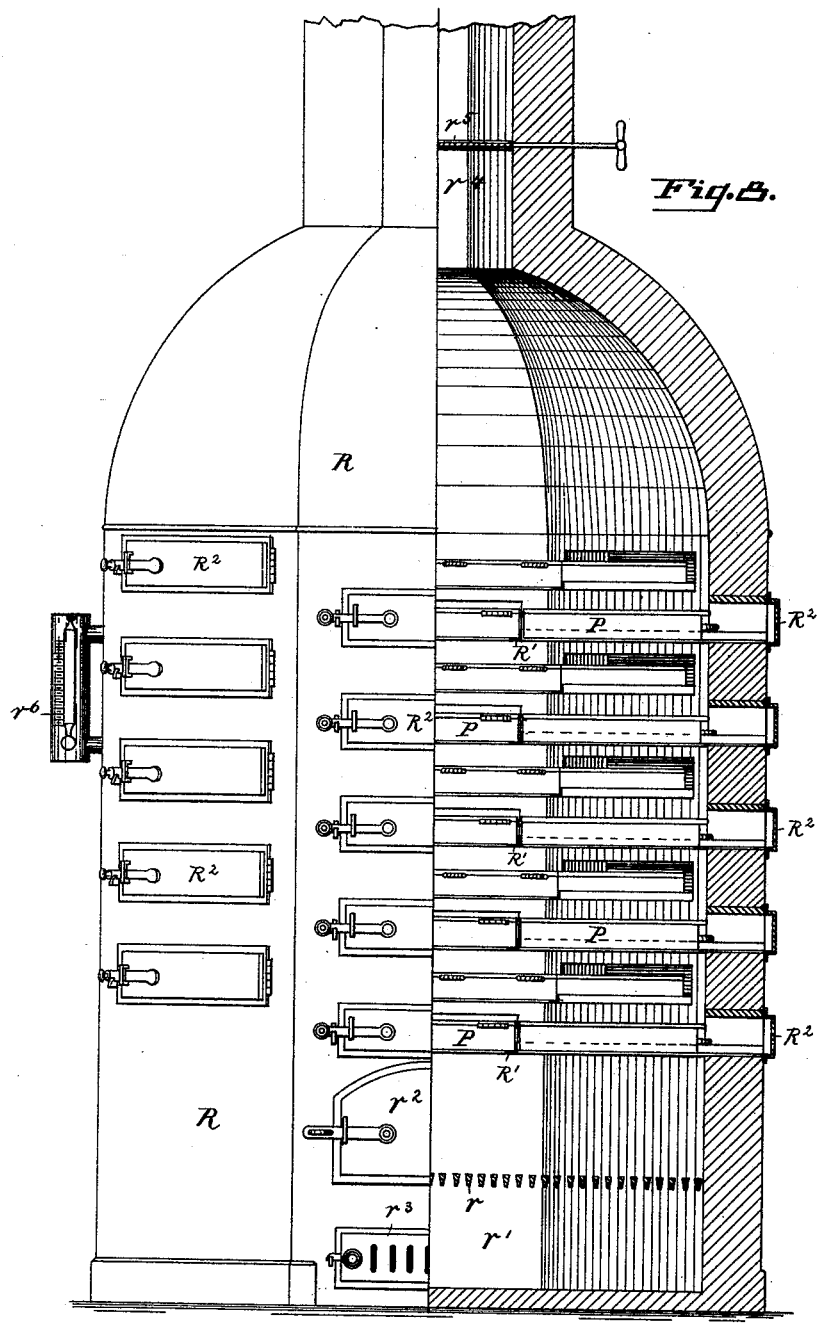
WITNESSES:
Hermann Bormann.
Thomas M. Smith.
INVENTOR:
Clement Payen,
by J. Walter Douglass.
Atty.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING CRYSTALLIZED METAL PLATES.

SPECIFICATION forming part of Letters Patent No. 415,349, dated November 19, 1889.

Application filed February 18, 1888. Serial No. 264,503. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Producing Crystallized Metal Plates, &c., of which the following is a specification.

My invention relates to the manufacture of porous crystallized metal plates or other structures.

The principal object of my invention is to provide a porous crystallized metal plate or other structure for use as an element of a storage-battery.

My invention consists in mixing or combining with the salt of a metal before, during, or after its fusion one or more metallic salts, then discharging the mass into a mold wherein in cooling the same assumes a crystallized form, and then reducing the cast structure to a metallic state and eliminating therefrom foreign material not forming a component part of the metal required, whereby a strong porous crystallized metal plate or other structure will be produced, especially adapted for use as an element of a secondary or storage battery.

In the manufacture of a porous crystallized metal plate or other structure it is essential to select a metallic salt which is not subject to decomposition by the action of heat before the point of fusion is reached, and also one that is not too volatile. It is well to use a metallic salt that may be melted at a low temperature.

In the accompanying drawings I have illustrated apparatus for the conduct of my improved method and in such forms, respectively, as I have found practically efficient, and in which—

Figure 7:
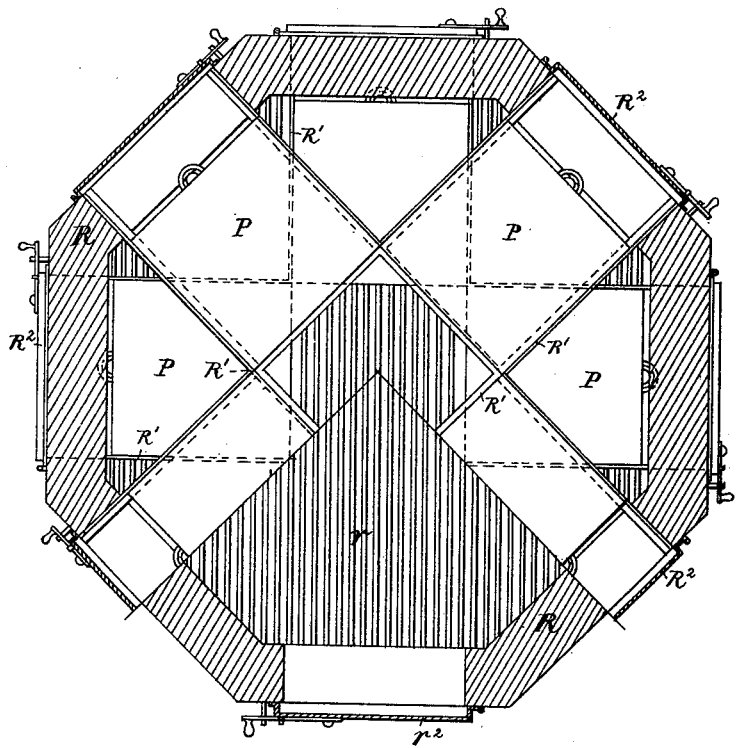
Figure 6:
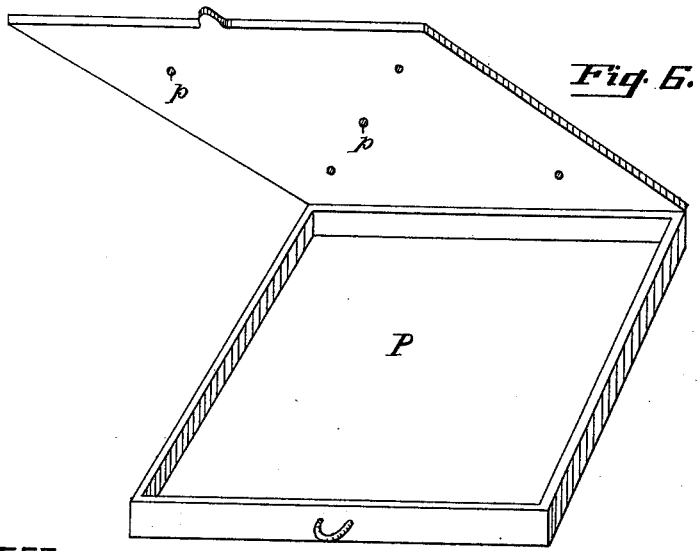

Figure 1 is a vertical central section through a melting-furnace of my improved construction, showing the crucible pivotally supported therein and operated by a lever for discharging the contents thereof. Fig. 2 is a top or plan view of my improved mold made in two sections hinged together, and showing also the clamping devices. Fig. 3 is an end view of said mold. Fig. 4 is a perspective view of said mold made in two sections hinged together, and showing also the interior formation thereof. Fig. 5 is a diagrammatic view showing a vase with a system of crystallized plates arranged alternately between a system of ordinary lead or charcoal plates insulated from each other and from the vase, and the two systems of plates connected through tongues or supports and wires with a dynamo, and which view illustrates one manner by electrolysis of reducing the several crystallized plates to a metallic state. Fig. 6 is a perspective view of a two-part mold for eliminating by fusion, sublimation, or volatilization foreign elements contained in the reduced metal plate. Fig. 7 is a transverse sectional view of a heating-furnace, showing a portion of the grate thereof and supporting frames and molds mounted thereon, whereby foreign elements contained in the metal plates may be readily eliminated by sublimation or volatilization; and Fig. 8 is a view of the heating-furnace, partly in elevation and partly in section.

Referring to the accompanying drawings, A is the fusing-furnace, constructed of brick or other material, of any form.

B is a grate located and supported in the lower part of the furnace.

Beneath the grate B is an ash-pit C, closed from the outside of the furnace by means of a door c.

D is a draft-flue leading to the chimney D'.

E is an arch, made of brick or other refractory material, in the upper part of the furnace and supported in position by a metallic ring e. This ring e is held in position by means of columns f, arranged and supported in the brick-work of the furnace in any manner.

F is a porcelain crucible or melting-pot, and around the outer circumference thereof is formed a layer d of amianthus, asbestus, or other suitable material, and between the layer d and the metallic pot F' is a layer of sand f' of any desired thickness. The metallic pot F' is pivotally supported in a central position within the furnace, and is operated from the outside by a lever $f^2$, attached to one of the journals of the metallic pot F', whereby the crucible F may be readily tilted for discharging the contents thereof into a receptacle for further treatment.

H is an inclined hopper provided with a removable stopper $h$, by which arrangement the material may be readily charged into the crucible F.

I is a sliding door operated in any convenient manner to allow of the discharge of the mass or compound into a suitable mold for causing crystallization to take place therein.

The characteristic features of the melting or fusing furnace having been described, I will now proceed to explain the first step of my process in the producing of a crystallized metal plate or other form of structure with porosity of a given size, and for the sake of illustrating my invention I will describe the manner of producing a lead plate of a size varying from six to twelve inches square: I take a charge of chloride of lead, ($PbCl_2$,) and to which I add two per cent., by weight, (more or less,) of chloride of cadmium and two per cent., (more or less,) by weight, of chloride of zinc or of metallic zinc, and these chlorides or the metal, or both, may be added either before, during, or after the fusing of the chloride of lead; but I prefer to add the chloride of cadmium or chloride of zinc, or both chlorides, gradually during the fusing of the charge of lead in the crucible F. The proportion of chloride of cadmium and of chloride of zinc or of metallic zinc to the charge of chloride of lead will in each case depend upon the degree of porosity desired in the finished plate or other suitable form of structure, and, moreover, as the percentage of the chlorides or salts of the metals added or combined with the base salt for obtaining the metal desired is increased or diminished so will the strength of the finished product be increased or diminished.

If chloride of cadmium and chloride of zinc or chloride of cadmium and the metal zinc be added or combined with the charge of chloride of lead, the plates produced by my method of treatment will possess great strength and the fractures thereof will be of a clean and uniform surface. The plates will be much stronger than they would be had the chloride of cadmium not formed an element of the compound for treatment in the production thereof.

In the simple addition of chloride of cadmium to the charge of chloride of lead a plate may be readily obtained which is not of a hygroscopic nature, and this is a very necessary condition, especially when it is desired to form a frame around the plate for using the same to "form" electrodes for electrical accumulators or secondary-battery systems. When either metallic zinc or chloride of zinc has been combined with chloride of lead, the plate, after crystallization has taken place, will be more or less hygroscopic, yet not to an extent to impair the ultimate utility of the plate after reduction to a metallic state, especially if a maximum degree of porosity is not required, while on the other hand, if the chloride of cadmium, which of itself is not deliquescent, be combined therewith, an excellent product will be readily and economically obtained, with the degree of porosity and strength desired. If a plate of metal zinc is desired, by combining with the chloride of zinc or another salt or salts of zinc chloride of lead or chloride of cadmium, or an ammonium chloride, or any other salt or salts, or chloride or chlorides of the metals, or a combination or admixture of two or more of them, with the base salt or chloride of zinc, and first fusing them and then subjecting the mass or compound to the treatment to be hereinafter described, I am enabled to produce a crystallized metal plate or other structure of any metal desired with the requisite degree of porosity and strength, and with, as well, the crystalline atomic aggregation preserved in each with geometrical regularity, and therefore I do not wish to limit myself to the treatment of the above-mentioned salt of a metal when combined with one or more other salts of the metals or a metal or metals to have the characteristic features hereinabove mentioned. The aforesaid mass or compound having been fused in the crucible F, the sliding door I is raised and the crucible tilted by means of the lever $f^2$ sufficiently to permit of the discharge of the contents into a mold M through the mouth $m$ thereof, and in a few minutes thereafter in the cooling the mass or compound will assume a crystallized form.

It is well to select the material for the mold M, and it is important that the interior thereof should be perfectly smooth. The mold to which preference is given is one made of either brass or bronze, and composed of two symmetrical sections $m'$ and $m^2$, chamfered as shown in Fig. 4, the two sections of the mold being connected together by means of a hinge $m^3$ and held firmly together by means of catches $m^4$, secured to the extremities of the shaft $m^5$, held in bearings $m^6$, formed with one of the sections and operated by a lever $m^7$, as shown in Figs. 2 and 3. This mold may be formed so that each section will be of a uniform thickness of metal, and the thickness of each section varying according to the dimensions of the crystallized plate to be formed. When a fused mass is poured into a two-part mold of equal thicknesses of metal, the mass will commence to cool from each side and the crystals composing the same will meet or unite with each other at their summits, sides, or facets, forming columns throughout the mass, and the columns thus formed from the respective sides of the mold meet or unite at the median line of the plate or other structure. On the other hand, if the parts of the mold are of unequal thicknesses of metal, the crystals of the mass will commence to cool therein from the side having the greater thickness of metal, and will meet the mass forming in columns from the opposite side of the mold beyond the median line of the plate or other structure. The plate or other structure thus formed may then be removed from the mold for further treatment, as follows: In a vase G, containing sulphuric acid and water in the proportion of ten per cent. of sulphuric acid, (more or less,) a series of the crystallized plates may be mounted therein upon glass insulators $o$, held in the grooves of a series of rectangular-shaped bars $o'$, made of rubber or other suitable insulating material, and having preferably formed integral therewith vertical rods $o^2$, of insulating material, the system of crystallized plates 2, mounted in the vase G, being alternated with plates 3 of equal dimension composed of lead, charcoal, or other suitable material, and provided with lugs forming conductors 4. Against one edge of each of the crystallized plates 2 is placed a strip of lead or other material, forming a conductor 5, and held snugly up against the edge of each of said crystallized plates 2 by means of a bar or strip 6, made of rubber or other suitable insulating material. The two systems of plates 2 and 3 should be mounted firmly in the vase G, so that there will be no play whatever of the plates therein, in order that bulging, warping, or cracking of the crystallized plates may be entirely prevented, which is quite important, because if any play were permitted in the reduction of the crystallized plates to a metallic state the tendency would be for them to bulge or warp, and thus impair the ultimate utility thereof. The system of crystallized plates 2 and conductors 5, arranged in contact therewith, having been mounted in the vase G, are alternated with plates 3, with conductors 4 of equal dimension composed of lead, charcoal, or other material, and the two systems of plates properly insulated from each other and from the vase G, as shown, for instance, in Fig. 5, and the wires 7 and 8 are connected with their respective conductors 4 and 5 and a dynamo N, the system of crystallized plates 2 being connected through the wire 8 with the negative electrode $s$ of the dynamo N, while the system of lead, charcoal, or other plates are connected through the wire 7 with the positive electrode $n$ of the dynamo N, and in consequence of the electrolysis, which is allowed to take place, the oxygen and chlorine will be separated and caused to attack the system of lead, charcoal, or other plates, while on the system of crystallized plates there will remain zinc and cadmium metallic if they were the chlorides used in conjunction with the base salt of a metal in the production of a crystallized metallic lead plate. The same treatment may be resorted to, as above mentioned, for producing a crystallized metal plate from the salt of any other metal having the salt or salts of another metal or metals combined therewith before, during, or after fusion of the mass, but, however, before crystallization in the cooling thereof and reduction to a metallic state. The crystallized plates, having been reduced to a metallic state, may then be removed from the vase G for the elimination by fusion, sublimation, or volatilization of those foreign elements still contained in said reduced plates, and which do not form a component part of the metal required. After the removal of the several crystallized metal plates from the vase G, they may be thoroughly washed in any well-understood manner, and then placed in a mold P, as shown in Fig. 6; or the mold may be made of any other suitable form, but of such form as that when the plate is mounted therein for treatment it will in the main be impervious to the outside air. The lid of the mold P may be provided with a series of small openings for the escape of vapor from the plate mounted in the said mold.

In Figs. 7 and 8 I have illustrated an octagonal form of furnace R, to which I give preference for fusing, sublimating, or volatilizing the foreign elements contained in the crystallized plates after reduction thereof by electrolysis or in any other suitable manner to a metallic state. This furnace R, made of brick or other suitable material, is provided in the bottom thereof with a grate $r$, and beneath the same is an ash-receptacle $r'$, access to said grate $r$ for firing the furnace being had by means of a door $r^2$ and to said ash-chamber $r'$ by means of a door $r^3$. In the furnace, at a suitable distance above the grate $r$, arranged at right angles to each other, are L-shaped rails R′, placed one above the other, access to these rails for mounting the molds thereon from the outside of the furnace being had by means of doors $R^2$. The upper part of the furnace, as shown in Fig. 8, is by preference formed dome-shaped, with a centrally-located stack or chimney $r^4$, for the free discharge of smoke, fumes, vapors, or other foreign elements into the open air. The furnace R having been fired in any suitable manner, the doors $R^2$ may then be opened for introducing the molds P, containing the crystallized plates, onto the rails R′, arranged in tiers, one above another, in said furnace. The furnace R having been heated up, the damper $r^5$ is then partially closed, and the temperature of the furnace raised sufficiently, which the thermometer $r^6$ will from time to time indicate to the attendant in charge, to cause separation and the volatilization of the foreign elements contained in the crystallized plates held in the molds P and mounted on the rails R′ in the furnace. The molds may then be drawn out of the furnace, and when cool the crystallized plates removed therefrom. It will be found that upon their removal from the molds P these plates will be chemically pure and have the degree of porosity and strength desired. Cadmium alone existing in a metal plate after reduction may be readily eliminated by raising the temperature sufficiently to cause the fusion thereof, which will sink to the bottom of the mold, and upon removal of the plate from said mold a pure metallic plate will be thereby formed, with porosity and substantial strength.

Cadmium and zinc existing in a metal plate may be readily and economically eliminated by my method of treatment by raising the temperature of the furnace sufficiently to cause volatilization thereof. Take another example, that of a crystallized metal plate of iron produced in accordance with the method of treatment hereinbefore described, having combined therewith arsenic and cadmium. Now, inasmuch as iron melts at about 1,600° centigrade and arsenic at about 180° centigrade, and cadmium at about 260° centigrade, if the molds P containing said crystallized plates be subjected to a temperature of 300° centigrade the effect will be to cause sublimation or volatilization of the arsenic contained in said plates and at the same time to melt the cadmium, thereby causing the same to sink to the bottom of the mold, and which may be removed from the mold in any suitable manner. By simply raising the temperature of the furnace sufficiently the cadmium may be also volatilized. The crystallized plates treated in the above manner may be then removed from the molds when cool and the plates will be in a chemically pure metallic state, with porosity and substantial strength for such purposes as may be desired.

Having thus described the nature and objects of my invention, what I claim as new, and desire to secure by Letters Patent, is—

1. The method of producing a porous crystallized metal structure, which consists in mixing or combining with the salt of a metal before or during fusion another salt or salts of a metal or metals, then casting the mass in a mold and allowing it to crystallize therein, then reducing the same to a metallic state electrolytically, and then eliminating by heat all matter not forming a component part thereof, substantially as and for the purposes set forth.

2. The method of producing a porous crystallized metal plate, which consists in mixing or combining with the salt of a metal before or during fusion another salt or salts of a metal or metals, then casting the mass in a mold and allowing it to cool and crystallize therein, then reducing the same to a metallic state, and then volatilizing the matter not forming a component part of the metal required, substantially as and for the purposes set forth.

In witness whereof I have hereunto set my hand in the presence of two subscribing witnesses.

CLÉMENT PAYEN.

Witnesses:
 GEO. W. REED,
 CHAS. HART.